(12) United States Patent
Tangirala et al.

(10) Patent No.: US 7,721,523 B2
(45) Date of Patent: May 25, 2010

(54) GROUND BASED PULSE DETONATION COMBUSTOR FOR POWER GENERATION

(75) Inventors: Venkat Eswarlu Tangirala, Niskayuna, NY (US); Adam Rasheed, Glenville, NY (US); Narendra Digamber Joshi, Schenectady, NY (US); Anthony John Dean, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/060,557

(22) Filed: Apr. 1, 2008

(65) Prior Publication Data
US 2009/0241507 A1 Oct. 1, 2009

(51) Int. Cl.
*F02C 7/10* (2006.01)
(52) U.S. Cl. .................. 60/39.511; 60/39.76; 60/247
(58) Field of Classification Search .......... 60/39.511, 60/39.76, 39.78, 247, 728
See application file for complete search history.

(56) References Cited

U.S. PATENT DOCUMENTS 7,096,674 B2* 8/2006 Orlando et al. ............... 60/782
2004/0144099 A1* 7/2004 Coleman et al. .............. 60/791
2005/0109010 A1 5/2005 Dean et al.
2005/0138930 A1* 6/2005 Foster-Pegg ................. 60/682
2005/0144959 A1 7/2005 Lu et al.
2008/0072577 A1* 3/2008 Taylor et al. ................. 60/295

FOREIGN PATENT DOCUMENTS

EP 1852590 A2 * 11/2007

OTHER PUBLICATIONS

Denise Lane, The Brayton Cycle with Regeneration, Intercooling, & Reheating, ME 372 Thermodynamics; pp. 1-14.

* cited by examiner

*Primary Examiner*—Michael Cuff
*Assistant Examiner*—Phutthiwat Wongwian
(74) *Attorney, Agent, or Firm*—Penny A. Clarke

(57) ABSTRACT

A ground based power generation system contains at least two compressor stages, a combustion stage and a turbine stage. An intercooler is positioned between the two compressor stages and a regenerator is positioned between the compressor stages and the combustion stage. The combustion stage contains at least one of a pulse detonation combustor and constant volume combustor. Downstream of the combustion stage is the turbine stage. Heat for the regenerator is supplied from the turbine stage. Further, a bypass flow device is included which re-directs flow upstream of the combustion stage to downstream of the combustion stage and upstream of the turbine stage.

21 Claims, 2 Drawing Sheets

GROUND BASED PULSE DETONATION COMBUSTOR FOR POWER GENERATION

BACKGROUND OF THE INVENTION

This invention relates to power generation systems, and in particular to ground based pulse detonation combustion systems for power generation.

In the world of power generation, one of the most important objectives is to maximize operational efficiency. This ensures that the maximum amount of power for a given amount of work or fuel consumption is obtained.

Current research in the area of aviation propulsion has led to the development of pulse detonation combustors (PDCs). Pulse detonation combustors produce pressure rise from periodically pulsed detonations in fuel-air mixtures, resulting in a relatively high operational efficiency when compared to the operational efficiency of a conventional gas turbine engine. Thus, it would be desirable to employ pulse detonation combustion technology in the power generation industry.

SUMMARY OF THE INVENTION

In an embodiment of the present invention, a power generation system contains a compressor portion which compresses a flow passing through it and an intercooler coupled to the compressor portion which reduces a temperature of the flow as the flow passes through at least a portion of the compressor portion. A regenerator is located downstream of the compressor portion which increases the temperature of the flow after it exits the compressor portion. The system also contains at least one pulse detonation combustor downstream of the regenerator which combusts the flow with a fuel which is added prior to combustion, and a turbine portion which receives the combusted flow from the pulse detonation combustor. The regenerator is coupled to the turbine portion and heat from the turbine portion is directed to the regenerator.

As used herein, a "pulse detonation combustor" PDC (also including PDEs) is understood to mean any device or system that produces both a pressure rise from a series of repeating detonations or quasi-detonations within the device. A "quasi-detonation" is a supersonic turbulent combustion process that produces a pressure rise higher than the pressure rise produced by a deflagration wave. Embodiments of PDCs (and PDEs) include a means of igniting a fuel/oxidizer mixture, for example a fuel/air mixture, and a detonation chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, auto ignition or by another detonation (i.e. a cross-detonation tube). The geometry of the detonation chamber is such that the pressure rise of the detonation wave expels combustion products out of the pulse detonation combustor and produces a high speed, high temperature and high pressure exhaust stream. Useful work and power are extracted from this exhaust stream, using a downstream multi-stage turbine. As known to those skilled in the art, pulse detonation may be accomplished in a number of types of detonation chambers, including detonation tubes, shock tubes, resonating detonation cavities and annular detonation chambers.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

Figure 1:
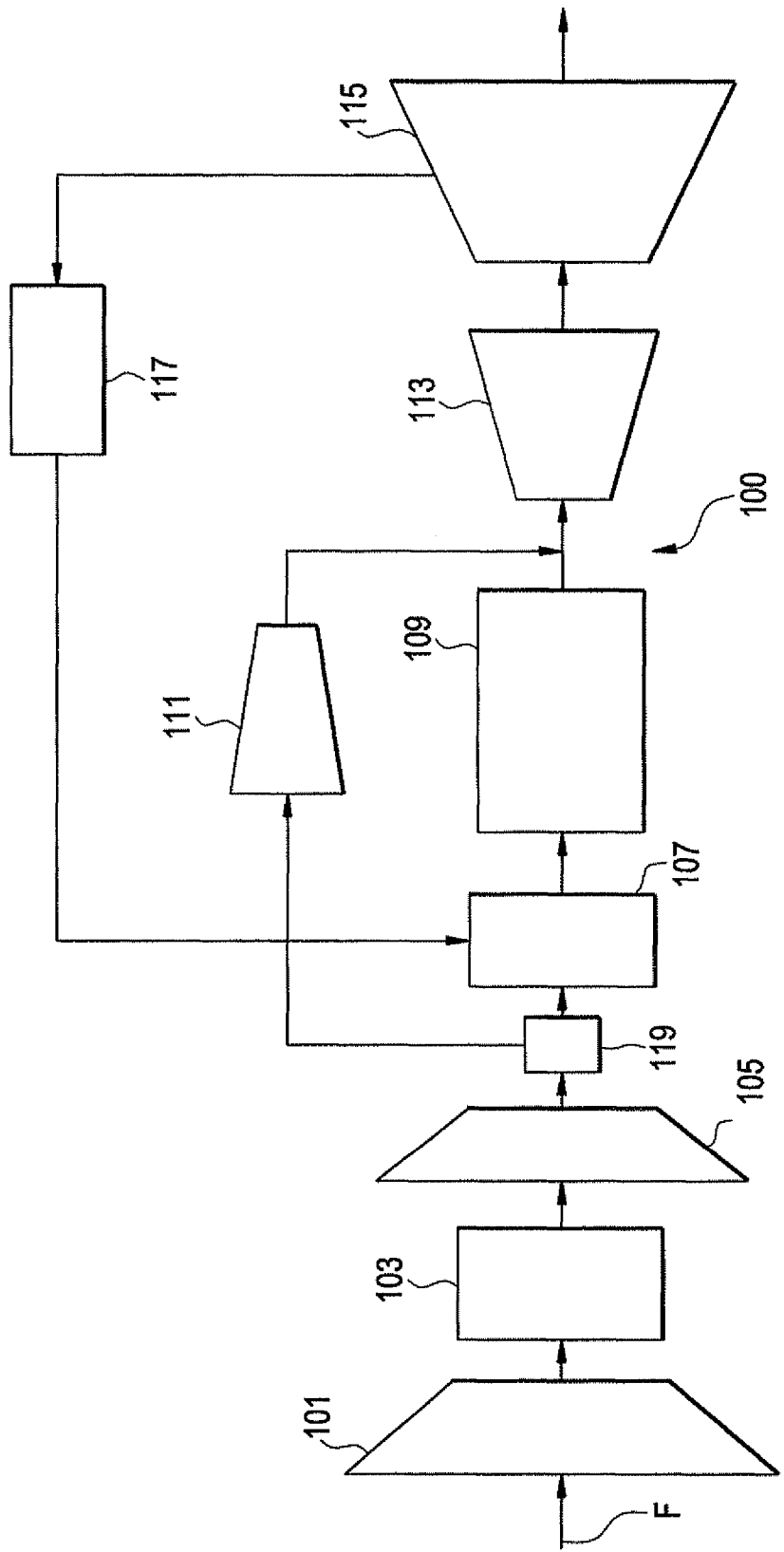
FIG. 1 is a diagrammatical representation of a pulse detonation combustion system in accordance with an exemplary embodiment of the present invention.

FIG. 1 depicts a diagrammatical representation of an exemplary embodiment of the power generation system 100 of the present invention. As shown, this embodiment of the invention includes a first compressor stage 101, an intercooler 103, a second compressor stage 105, a regenerator 107, a pulse detonation combustor 109, a bypass flow device 111, a high pressure turbine stage 113, and a low pressure turbine stage 115.

It is known that in the compression stage of a gas turbine type power generation system, an amount of work is required to cause the pressure increase in the compressor stage. This is typically referred to as the pressure-to-work ratio. It is desirable to have this ratio as large as possible, which essentially means that the amount of work used to create a pressure rise is minimized. However, it is also known that as the pressure rise is created, the density and the temperature of the fluid being compressed (typically air) are increased. This increase in temperature requires more work to operate the compressor stage.

An embodiment of the present invention addresses this by adding an intercooler 103 between a first compressor stage 101 and a second compressor stage 105. Both the first and second compressor stages, 101/105 are of any known or commonly used configuration and provide a pressure rise to the fluid being passed through the stages.

As the fluid flow F enters the first compressor stage 101 the fluid is pressurized. In an exemplary embodiment of the present invention, the fluid is air. The resulting increase in pressure, causes both the density and the temperature of the fluid to increase. Accordingly, in an embodiment of the present invention an intercooler 103 is placed downstream of the first compressor stage 101 but prior to the entrance of the second compressor stage 105.

The intercooler 103, which acts as a heat exchanger, operates to cool the fluid that exits the first compressor stage 101. This cooling causes the density of the fluid to increase prior to entering the second compressor stage 105. The intercooler 103 can be of any known heat exchanger configuration, which results in the overall cooling of the fluid prior to entering the second compressor stage. In an embodiment of the present invention, the intercooler 103 is of a configuration, which minimizes the creation of flow turbulence between the compressor stages. In another embodiment of the present invention, the intercooler 103 reduces the temperature of the fluid by about 100-200 degrees K. In an embodiment of the present invention, the intercooler 103 is a water-cooled system. However, the present invention is not limited in this regard as any conventionally known or used cooling medium or method may be employed.

In a further alternative embodiment, multiple intercoolers 103 are used to cool the compressed fluid gradually across multiple stages of the compression systems 101/105. In such an embodiment, a second intercooler can be placed immediately downstream of the shown intercooler 103. Alternatively, it is also contemplated that the compressor stage of the system 100 can be divided into more than one or two stages (as shown in FIG. 1), for example three stages—such that an intercooler 103 can be placed between the first and second, and second and third stages.

As the fluid exits the intercooler 103 it enters the second compressor stage 105, which further compresses the fluid. In an embodiment of the present invention, the second compressor stage 105 is of any conventionally known or used compressor configuration. Further, in an embodiment of the invention, the second compressor stage 105 has a different configuration and/or operational parameters than the first compressor stage 101.

Because of the presence of the intercooler 103 between the first and second compressor stages, the overall pressure-to-work ratio of the compressor stage of the system 100 is increased. Namely, because the temperature of the fluid is decreased during the overall compression together with the intercooling process, the amount of work required by the compression stage is reduced, while achieving an overall pressure increase consistent with compression stages, which do not have intercooling.

Additionally, in an embodiment of the present invention, the overall cooling effect in the fluid imparted by the intercooler 103, in pulse detonation combustor type systems, lowers the combustor inlet temperature, which aids in maximizing the heat release during the detonative combustion.

It is noted that the exact placement and thermal dynamic attributes of the intercooler 103 between the first and second compressor stages is a function of the operational parameters and characteristics of the overall system, and are to be chosen to obtain the desired performance characteristics.

In another embodiment of the present invention, cooling of the flow in the compressor stages is achieved by using the compressor components as heat exchangers. In such an embodiment, for example, the compressor stage components, such as blades, hub and/or housing contain a manifold structure, which enables the compressor components to act as the heat exchangers. In such an embodiment, the compressor stage may be a single stage or section compressor. Of course, it is contemplated that such an embodiment can be combined with the use of an intercooler 103 as discussed above.

In an embodiment of the invention, as the compressed fluid exits the second compressor stage 105, it enters a regenerator 107. The regenerator 107 heats the fluid as it passes from the second compressor stage 105 to the combustion portion of the system 100. The addition of heat to the fluid flow improves the overall thermal efficiency of the system 100. By heating the compressed air that enters the downstream pulse detonation combustor (discussed more fully below), the detonative process is optimized, due to faster chemical ignition kinetics at high temperatures, and also due to recycling of the heat from the exhaust stream to preheating of the inlet air after it is compressed.

In an embodiment of the present invention, the regenerator 107 obtains or recirculates heat from the downstream turbine portion of the engine and directs that heated flow into the compressed fluid as shown in FIG. 1. As shown in the embodiment in FIG. 1, the heat is obtained from the low-pressure turbine stage 115. However, the present invention is not limited in this regard. In another embodiment of the present invention, the heat is obtained from the high pressure turbine stage 113, and in a further embodiment the heat is obtained from a combination of both the high and low pressure turbine stages 113/115. (See FIG. 2). The heat is directed to the regenerator 107 through a conventional known or used manifold or duct system or a thermal transfer system, which is capable of directing the temperatures required from the turbine portion of the system 100.

In an embodiment of the present invention, the regenerator 107 is a commonly known or used heat exchanger used to impart heat to the flow coming from the upstream compressor.

Figure 2:
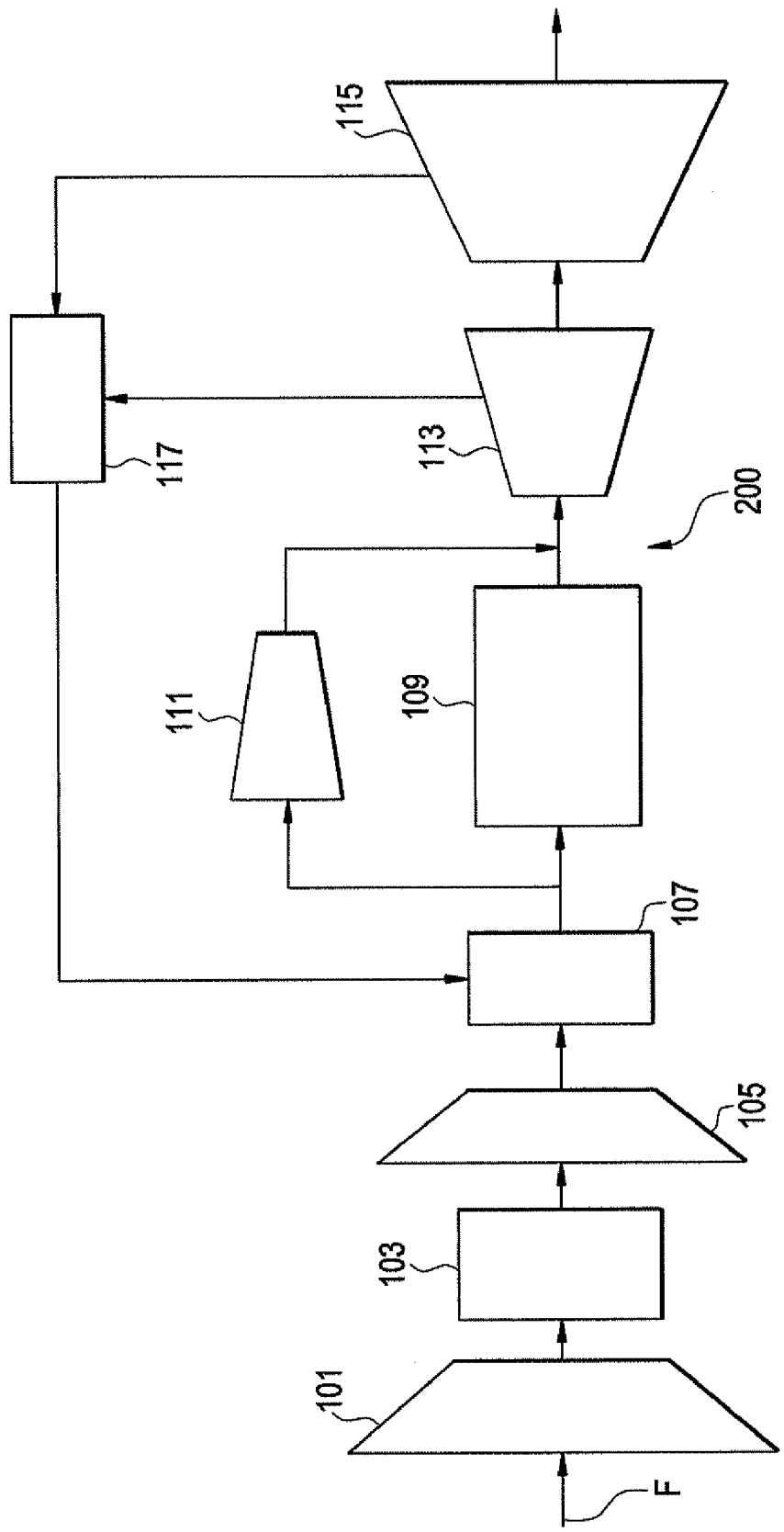
FIG. 2 is a diagrammatical representation of a pulse detonation combustion system in accordance with another exemplary embodiment of the present invention.

In yet a further embodiment, a flow regulation device 117 is employed to control the flow of heat to the regenerator 107. The flow regulation device 117 ensures optimal operation of the system 100, by the controlling the amount of heat recirculated or control the temperature of the flow to combustor 109. FIG. 2 is an alternative embodiment of the system 200, where the flow regulation device 117 not only controls the flow of heat to the regenerator 107, but also the amount of heat from each of the high and low pressure turbine stages 113/115 from which the heat is extracted from.

The flow control device 117 can be of any commonly known or used configuration and may be controlled either manually or via a computer control system (not shown) to optimize the performance attributes of the system 100/200. By controlling the flow to the regenerator 107, the flow control device 117 permits the inlet temperature and flow to the combustion stage (discussed more fully below) to be optimized for different operational parameters.

In an embodiment of the invention a flow from the low pressure turbine stage 113 is used to provide heat to the regenerator 107. In another embodiment, the flow comes from the high pressure turbine stage 115 or a combination of both the low and high pressure turbine stages. In another embodiment, rather than directing the flow to the regenerator 107 directly, heat from the turbine stage(s) is directed to an intermediate heat exchanger (not shown) which then directs the heat to the regenerator 107.

In the present application, the term "heat" as used above regarding the context of the regenerator 107 is intended to include heat directed from the downstream turbine stage to the regenerator and actual flow from the turbine stages. Thus, the present invention is not limited in this regard as the "heat" can be obtained through heat exchanging and/or through the heat from actual turbine flow.

In an embodiment of the invention, a temperature sensor (not shown) or a plurality of sensors (not shown) are employed to monitor temperature within the system to allow for optimized operation and control. For example, a temperature sensor may be coupled to the flow control device 117, such that the temperature reading can be used to control/operate the flow control device 117. In another embodiment, a number of sensors are placed throughout the system, for example at the intercooler 103, regenerator 107, etc. to allow for optimal control and operation of the system. In an embodiment of the invention information from the sensor(s) is sent to a controller which controls the system 100/200 as needed.

In an embodiment of the present invention, the temperature of the inlet flow to the combustor 109 is controlled to optimize performance of the system 100/200. In an exemplary embodiment of the invention, the regenerator increases the temperature of the flow by about 100 to 200° K. In an embodiment of the present invention, the inlet temperature to the combustor 109 is in the range of about 300 to 1,200 degrees K.

In a further embodiment of the present invention, the heated flow to the regenerator 107 is obtained from an external heat source (not shown). In yet another embodiment of the present invention the heat to the regenerator 107 is obtained from a combination of heat from a turbine stage and an external heat source (not shown).

Downstream of the regenerator 107 is the combustion stage of the system 100. In an embodiment of the invention the combustion stage contains at least one pulse detonation combustor (PDC) and/or constant volume combustor (CVC) 109 defined below.

Although the present invention contemplates use with both a PDC or CVC, or combination thereof for the interests of clarity and efficiency the following discussion will only use "PDC." It should be understood that for the following discussion PDC and CVC are interchangeable, unless otherwise stated. It should be further understood that a PDC, as used in the present application, includes an inlet portion, a combustion portion and exit nozzle, which are not shown as the overall structure for PDC devices are known. Further, it is contemplated that the combustor 109 of the present invention can be either a single or multi-tube PDC configuration, or can be made up of a number of separate PDCs.

During operation, the heated pressurized flow from the regenerator 107 is directed to an inlet of the PDC 109, where pulse detonation combustion occurs. Because pulse detonation combustion and constant volume combustion are emerging technologies, a detailed discussion of the process will not be included herein. However, it is contemplated that any pulse detonation or constant volume combustion device 109 can be used in various embodiments of the present invention. Further, the operation of the PDC/CVC is in accordance with commonly known or used methodologies to optimize it operation within the system 100. In a further embodiment of the present invention a plurality of PDCs or CVCs are employed. In a further alternative embodiment a combination of PDC(s) and CVC(s) based on the operational and performance parameters of the system 100/200.

As shown in the embodiments in both FIGS. 1 and 2, upstream of the PDC/CVC 109 at least a portion of the flow/temperature is directed to a bypass flow pump 111. The bypass flow pump 111 directs the flow/temperature to a downstream end of the PDC/CVC 109 such that the directed flow/temperature flow mixes with the PDC/CVC 109 exhaust prior to the mixed flow entering into the high-pressure turbine stage 113.

A bypass flow pump 111 is employed because of the pressure differential between the upstream and downstream ends of the PDC 109. Specifically, the pressure of the flow downstream of the PDC 109 is higher than the pressure of the flow at the upstream end. Therefore, a pump 111 is needed to drive sufficient flow into the exhaust flow of the PDC 109. As shown in FIG. 1, one embodiment of the invention, the bypass flow/temperature is taken from a point upstream of the regenerator 107. However, as shown in FIG. 2, an alternative embodiment, the flow/temperature through the bypass flow pump 111 is taken from a point downstream of the regenerator 107. One of the primary differences between these locations is the temperature of the flow, as the flow after the regenerator 107 will have a higher temperature than the flow upstream of the regenerator 107. The temperature needed may be dictated by operational and performance parameters of the system. It is further contemplated that an additional embodiment of the present invention will tap the flow/temperature from a combination of both locations depending on performance and operational parameters.

In an embodiment of the invention, a heat exchanger 119 is employed to direct the temperature of the flow prior to entering the regenerator 107 to the bypass flow pump 111. (Shown in FIG. 1). In this embodiment no actual fluid flow is directed to the bypass flow pump 111. Instead the heat exchanger 119 extracts some temperature which is carried by a separate flow or thermal transfer medium to downstream of the PDC 109.

However, in another embodiment of the present invention a portion of the actual fluid flow is directed through the bypass flow device 111. (Shown in FIG. 2). In this alternative embodiment a flow valve or comparable device (not shown) may be employed to regulate the amount of the flow being directed toward the bypass flow pump 111. The FIG. 2 embodiment shows the fluid flow being tapped from downstream of the regenerator 107. Of course, this embodiment can be used as shown in FIG. 1 where the actual fluid flow is tapped from upstream of the regenerator 107 depending on the desired configuration.

In a further alternative embodiment of the present invention, either a portion or all of the bypass flow, from the pump 111, is directed to a portion of the turbine stage such that the bypass flow mixes with and/or interacts with turbine flow. Specifically, in an exemplary embodiment, a portion (or all) of the bypass flow from the pump 111 is directed to mix with the flow between the high pressure stage 113 and the low pressure stage 115. The amount or percentage of bypass flow directed to upstream of the turbine stage 113 and/or after the turbine stage 113 (prior to stage 115) is determined based on operational and performance parameters and can be controlled or varied depending on varying operational parameters.

In a further embodiment of the present invention, an inlet plenum (not shown) is coupled to or adjacent to an inlet of the combustor 109, where the inlet portion may or may not have an inlet flow control valve (not shown) used to control flow into the PDC 109. Because PDC and CVC technologies are emerging, a detailed discussion of the plenum and inlet flow control valve will not be included herein.

Because PDC/CVC type devices provide a significant pressure rise at their downstream ends (at their exhaust), an embodiment of the present invention employs the bypass flow provided by the bypass flow pump 111 to stabilize the inlet flow and temperature into the high pressure turbine stage 113. Because of the pulsed nature of a PDC type device, this stabilization aids in ensuring that the turbine stages of the system 100 operate efficiently. Thus, in an embodiment of the present invention the bypass flow pump 111 is controlled to optimize flow temperature and stabilization into the high pressure turbine stage 113. The bypass flow can be controlled manually or via a computer control system, or the like, to ensure optimal system operation.

As shown in the embodiments of FIGS. 1 and 2 the bypass flow can come from either upstream or downstream of the regenerator 107. However, in another embodiment of the present invention, the bypass flow comes from an external source (not shown) to provide the stabilization flow downstream of the PDC/CVC 109.

In an embodiment of the present invention, the bypass flow is introduced to the flow downstream of the PDC/CVC 109 via a manifold structure (not shown) to optimize flow mixing, stabilization and thermal distribution through the PDC/CVC flow.

As shown in the embodiments depicted in FIGS. 1 and 2, after the bypass flow is re-introduced into the system flow, the system flow is directed to a high pressure turbine stage 113. Following the high pressure turbine stage 113, is a low pressure turbine stage 115. Although two turbine stages are shown, it is noted that the present invention is not limited in this regard as the system may have a single turbine stage or more than two turbine stages depending on the system work and performance requirements. Further, in an embodiment of the present invention the turbine stages 113/115 are configured to provide optimal performance with a PDC type combustor.

In a further exemplary embodiment of the present invention either all or a portion of the bypass flow is directed to either one or both of the high and low pressure turbine stages 113/115. This is done to allow the bypass flow to be used to cool the turbine structure, including blades, etc.

With regard to downstream of the turbine portion of the system 100, the present invention is not limited in this regard. It is contemplated that any known configuration or system components can be employed downstream of the turbine stages 113/115 without altering or adversely affecting the present invention.

Moreover, it is noted that although both FIGS. 1 and 2 depict the system as co-axially configured, this is intended to merely exemplary in nature as the present invention is not limited in this regard. In an embodiment of the present invention, it is contemplated that the system is configured co-axially, whereas in an alternate embodiment various components are not positioned co-axially. For example, it is contemplated that the compressor and turbine portions are not positioned co-axially, or along the same drive shaft (not shown).

It is noted that although the present invention has been discussed above specifically with respect to power generation applications, the present invention is not limited to this and can be employed in any application in which efficient power or work generation is required.

While the invention has been described in terms of various specific embodiments, those skilled in the art will recognize that the invention can be practiced with modification within the spirit and scope of the claims.

What is claimed is:

1. A power generation system; comprising:
a compressor portion which compresses a flow passing through said compressor portion;
an intercooler coupled to said compressor portion which reduces a temperature of said flow as said flow is passing through at least a portion of said compressor portion;
a regenerator downstream of said compressor portion which increases the temperature of said flow after said flow exits said compressor portion;
at least one pulse detonation combustor downstream of said regenerator which combusts said flow with a fuel which is added prior to said combustion to produce a pressure rise of said combusted flow from a series of repeating detonations and quasi-detonations within the at least one pulse detonation combustor; and
a turbine portion which receives said combusted flow from said at least one pulse detonation combustor;
wherein said regenerator is coupled to said turbine portion and heat from said turbine portion is directed to said regenerator through said coupling.

2. The power generation system of claim 1, wherein said compressor portion comprises a first and second compressor stage and said intercooler is positioned between said first and second compressor stages.

3. The power generation system of claim 1, wherein said turbine portion comprises a high pressure and low pressure turbine stage and said heat from said turbine portion comes from said low pressure turbine stage, said high pressure turbine stage, or a combination of both.

4. The power generation system of claim 1, wherein heat to said regenerator is controlled via a flow control device.

5. The power generation system of claim 1, wherein the intercooler reduces the temperature of the flow by about 100 to 200 degrees K.

6. The power generation system of claim 1, wherein the regenerator increases the temperature of the flow by about 100 to 200 degrees K.

7. The power generation system of claim 1, wherein a bypass flow enters said combusted flow prior to said combusted flow entering said turbine portion.

8. The power generation system of claim 7, wherein at least some of said bypass flow comes from said flow upstream of said at least pulse detonation combustor.

9. The power generation system of claim 7, wherein at least some of said bypass flow comes from said flow upstream of said regenerator.

10. The power generation system of claim 1, wherein at least a portion of a bypass flow enters said combusted flow prior to said combusted flow entering said turbine portion and a remaining portion of said bypass flow enters said combusted flow exiting a high pressure portion of said turbine portion.

11. A power generation system; comprising:
a first compressor stage which compresses a flow passing through said first compressor stage;
an intercooler downstream of said first compressor stage which reduces a temperature of said flow;
a second compressor stage downstream of said intercooler which further compresses said flow;
a regenerator downstream of said second compressor stage which increases the temperature of said flow;
at least one pulse detonation combustor downstream of said regenerator which combusts said flow with a fuel which is added prior to said combustion to produce a pressure rise of said combusted flow from a series of repeating detonations and quasi-detonations within the at least one pulse detonation combustor;
a turbine portion which receives said combusted flow from said at least one pulse detonation combustor; and
a bypass flow device that directs at least a portion of said flow upstream of said at least one pulse detonation combustor to provide a bypass flow that mixes with said combusted flow from said at least one pulse detonation combustor,
wherein said regenerator is coupled to said turbine portion and heat from said turbine portion is directed to said regenerator through said coupling.

12. The power generation system of claim 11, wherein said turbine portion comprises a high pressure and low pressure turbine stage and said heat from said turbine portion comes from said low pressure turbine stage, said high pressure turbine stage, or a combination of both.

13. The power generation system of claim 11, wherein heat to said regenerator is controlled via a flow control device.

14. The power generation system of claim 11, wherein the intercooler reduces the temperature of the flow by about 100 to 200 degrees K.

15. The power generation system of claim 11, wherein the regenerator increases the temperature of the flow by about 100 to 200 degrees K.

16. The power generation system of claim 11, wherein a bypass flow enters said combusted flow prior to said combusted flow entering said turbine portion.

17. The power generation system of claim 16, wherein at least some of said bypass flow comes from said flow upstream of said at least pulse detonation combustor.

18. The power generation system of claim 16, wherein at least some of said bypass flow comes from said flow upstream of said regenerator.

19. A power generation system; comprising:

a compressor portion which compresses a flow passing through said compressor portion;

an intercooler coupled to said compressor portion which reduces a temperature of said flow as said flow is passing through at least a portion of said compressor portion;

a regenerator downstream of said compressor portion which increases the temperature of said flow;

at least one pulse detonation combustor downstream of said regenerator which combusts said flow with a fuel which is added prior to said combustion to produce a pressure rise of said combusted flow from a series of repeating detonations and quasi-detonations within the at least one pulse detonation combustor; and a turbine portion which receives said combusted flow from said at least one pulse detonation combustor;

wherein said regenerator is coupled to said turbine portion and heat from said turbine portion is directed to said regenerator through said coupling, and wherein a bypass flow enters said combusted flow prior to said combusted flow entering said turbine portion.

20. The power generation system of claim 19, wherein said turbine portion comprises a high pressure and low pressure turbine stage and said heat from said turbine portion comes from said low pressure turbine stage, said high pressure turbine stage, or a combination of both.

21. The power generation system of claim 19, wherein at least some of said bypass flow comes from said flow upstream of said at least pulse detonation combustor or from said flow upstream of said regenerator, or a combination of both.

* * * * *